United States Patent Office 3,702,265
Patented Nov. 7, 1972

3,702,265
LEAD-ACID STORAGE BATTERY PASTE
Richard N. Snyder, Anderson, and Ellis G. Wheadon, Yorktown, Ind., assignors to General Motors Corporation, Detroit, Mich.
No Drawing. Filed June 25, 1971, Ser. No. 157,003
Int. Cl. H01m 39/00
U.S. Cl. 136—26                              5 Claims

ABSTRACT OF THE DISCLOSURE

Lead-acid storage battery paste containing battery makers lead oxides, a first bulking agent such as carboxymethylcellulose, and less than about 4% by weight of a second bulking agent comprising hollow, multicellular, siliceous amorphous globules having friable walls.

BACKGROUND OF THE INVENTION

The lead-acid storage battery industry, and particularly the SLI segment thereof, has long sought economical techniques to increase the utilization efficiency of the lead oxide paste. To this end, bulking techniques have been employed which increase paste porosity and reduce its density. Bulking is accomplished during the paste-making process and usually involves increasing the water content of the paste while, at the same time, maintaining the plasticity of the paste within a predetermined range determined principally by the grid pasting equipment employed. Too much water alone causes the paste to lose its paste-like consistency and it becomes soupy and too thin for pasting. The most common practice involves making an acid or sulfate paste in which sulphuric acid is added to the paste-making water and mixed with the oxides. This forms lead sulfate in the paste which tends to stiffen it even at the higher water content. Sulfate pastes alone are usually density limited in that they do not usually go below 65 g./in.$^3$. Other bulking techniques include adding lead sulfate or other metal sulfates directly to the oxides. High sulfate pastes, however, tend to make mechanically weak plates which are both difficult to process and have short service lives. Likewise, when the sulfates exceed about 20%, the paste will actually set up like cement in the mixers before pasting is possible. Additionally sulfate pastes require "cleaning out" of the sulfates during formation. Acid or sulfate pastes therefore require close processing controls throughout. Solid inert filler-type bulkers such as pumice, silica, finely divided carbon, cellulose and china clay have been proposed as bulkers but only low concentrations of them are possible since paste cohesion is rapidly lost as the filler content increases above about 0.1%. Plate capacity and conductivity are similarly affected by these fillers. Still another technique is described in U.S. Pat. No. 2,674,642, Agruss, which uses hydrophilic additives such as carboxymethylcellulose (CMC) as a bulker. When enough CMC is used, good bulking is possible without an $H_2SO_4$ addition to the mixing water thereby providing a neutral, non-reacting mix known as water-based paste. Water-based pastes have distinct processing advantages over the acid or sulfate pastes. In this regard, water-based pastes have an extended pot life, cure easier since there is no reaction involved, have shorter and less critical mixing schedules and require no "clearing" during formation. The higher the concentration of the CMC, the more water the paste will retain. CMC, however, is quite costly to the point of being an uneconomical way of bulking, especially in the quantities required to reduce the density of the paste significantly. Continued cycling of CMC-type pastes indicates a decrease in capacity apparently due to a loss of the initial porosity.

OBJECTS OF THE INVENTION

It is the object of the present invention to provide an SLI-type battery paste including the combination of a first known bulker, particularly CMC, and a second filler-type bulker which permits the economical manufacture of low density, highly cohesive and readily processable lead-acid storage battery pastes having improved ampere-hour capacities after extended cycling. This and other objects of this invention will become more apparent from the detailed description which follows.

THE INVENTION

This invention comprehends a lead-acid storage battery paste comprising battery makers lead oxides, a conventional bulker and about 0.3% to about 4% of hollow, multicellular, siliceous, amorphous globules having friable walls. A preferred form of this invention relates to a water-based paste including the combination of less than 0.2% carboxymethylcellulose (CMC) and about 0.6% to 4% of an expanded perlite or perlite-like material. The paste is useable in both positive and negative plates though the density (i.e. cube weight) of the plates will vary somewhat, as is well known in the art. Negative pastes have been made as low as 42 gms./in.$^3$. Likewise, when used in negative plates, appropriate expanders are added to the paste, as is known to those skilled in the art. As indicated, the siliceous, amorphous, globules have thin friable glassy outer shells and intercell membranes which should not be broken during processing of the paste. These shells and membranes apparently break at different times during the life of the plate to continuously insure a certain degree of open porosity in the paste throughout its life.

Dynel or other strengthening fibers ranging from $\frac{1}{16}''$ to $\frac{1}{4}''$ in length may be added to this paste in concentrations of from about 0.05% to about 0.25% where the known benefits of these fibers are thought desirable.

Preferred globules comprise expanded perlite or like materials. Perlite in its natural state is a glassy rock found in the southwestern United States and contains about 65% to 75% $SiO_2$, about 10% to 20% $Al_2O_3$ and smaller concentrations of other metal oxides and 4% to 5% bound water. The perlite is ground into small particles before it is expanded as will be described hereafter. Another material of the type hereinvolved is expanded pumice. Pumice is a siliceous or glasslike material variously called volcanic dust or ash, and is found naturally in a pulverulent condition in a number of midwestern States. The particles appear as flat irregular shards. These particles are characterized by their ability to bloat, much like popcorn, upon sudden heating. In this regard, the heat apparently plasticizes the siliceous material and the bound water therein expands forming a plurality of hollow multicellular, amorphous globules, having a volume of as much as ten to twelve times that of the original particles. The bulk density of the expanded material will vary according to the size of the expanded particles, and classification of the starting particles directly controls the size of the expanded particles. Classification of the particles may be done after expanding but conventional classification procedures tend to cause considerable breakage of the expanded particles which is considered undesirable for purposes of the present application. We generally prefer to use expanded particles having a density of around 3–5 lbs. per cu. ft. The pumice, ground perlite or related particulate starting materials are first classified in a manner such that after expansion the "popped particles" will be generally in the size range of about 100 to 200 mesh. The classified particles are expanded by passing them through a high temperature (e.g. about 1000° C.) flame for sudden heating.

This is followed by rapid cooling. The rapid cooling prevents agglomeration of the particles while their glassy surfaces are still hot and plastic. For best performance, the pasted plates should retain as much of the unfractured particles as possible.

The amorphous siliceous globules permit the use of substantially lower concentrations of the other bulkers, e.g. sulfates, so as to utilize their bulking advantages without bringing their disadvantages into play. A preferred combination includes 0.6% to 4% expanded perlite (100-200 mesh) with a low concentration (i.e. less than 0.2%) CMC. The function of the CMC is set forth in detail in U.S. Pat. No. 2,674,642 and will not be repeated here. For purposes of this invention though, the CMC concentration need not exceed about 0.2% by weight of the lead oxides used hence making it now economically feasible to use CMC in SLI battery plates. Heretofore substantially more CMC i.e. at least about five (5) times that used herein, was required to produce the same low density plates now produceable with the combination of this invention. This combination permits the manufacture of economical, low density, non-reacting, neutral, water-based storage battery paste. Negative plates made in this manner have demonstrated low shrinkage, increased ampere-hour capacity after extended cycling, and improved in-plant processability in terms of plate strength, curing and forming. Negative plates made according to this invention have higher ampere-hour capacities and longer lives than conventional plates when tested according to the SAE life cycling test set out in SAE Standard J537F.

As used herein, the term "lead oxide" will be used to include those lead oxides which are normally used by and/or are familiar to battery manufacturers. These oxides are usually mixtures of lead oxides, typically the red and yellow oxides, with up to as much as 30% free lead. The combination of bulkers which is in this invention may be used with any of these conventional battery oxides. In fact, there are indications that substantial economies can be achieved by the use of poorer grades of these oxides without a substantial loss in battery performance. As used herein, the term "expander" will be used in the normal sense understood by those having ordinary skill in the art. In this regard, see G. W. Vinal, "Storage Batteries," 4th edition 1955. Hence, though specific lead oxide mixtures and specific expanders will be given by way of example they in no way limit the invention here involved.

EXAMPLE I 2000 lbs. of battery makers lead oxide containing about 74% to 79% lead oxide in a ratio of one (1) part red lead oxide to one (1) part yellow lead oxide, and the balance free lead is added to a Simpson blender (without mullers). To that is added 2 lbs. (0.1%) CMC powder, Hercules 12M31. To that is added 13 lbs. of dry expander material containing barium hydroxide, sawdust, colloidal carbon, sodium hydroxide and nickel sulfate. To that is added 20 lbs. of dry expanded perlite. The particular material used here is further identified as "Dicalite" (100-200 mesh) which is said by its manufacturer to comprise about 66% silicon oxide, 16% aluminum oxide, 10% potassium oxide, 8% sodium oxide and the balance a variety of metal oxide impurities. The dry materials are gently dry blended in the Simpson for about two minutes so as to provide good mixing without substantial breakage of the friable globules of Dicalite. After dry blending the blender is shut down and 133 liters of water plus 4.3 liters of a 50% lignosulphonic acid solution are added to the dry mix and allowed to soak (without mechanical agitation) for about ten minutes in order to thoroughly wet the dry powders. The lignosulphonic acid here added is a high molecular weight fraction such as described in U.S. Pat. No. 3,523,041. When the particles are thoroughly wetter, the blender is again started for a very short time (e.g. about 30 seconds), or 10 to 15 revolutions, until the wetted mass thickens to a paste-like consistency having a plasticity of about 200 according to falling cylinder test set out in ASTM D-217, in which the unit of measurement is 0.1 mm. The dry weight, or density, of this mix is about 60 grams/in.³. The plasticity of the material can be adjusted to render it more fluid by wet blending a little bit longer to cause breakage of some of the expanded particles. Hence it is always desirable to initially stop the blender while the paste is a bit thick since it can easily be thinned though not easily thickened. Depending on the particular type of grid pasting machine, to be used with the paste, the plasticity may be varied from about 150-280. In this particular example, a plasticity of 200 was selected since the paste was to be used in a Lund machine.

EXAMPLE II

Another negative plate paste was formulated using (1) 300 lbs. of oxides such as discussed in Example I, (2) 1180 grams of an expander containing barium hydroxide, sawdust, colloidal carbon, NaOH, and waste sulfite liquor, (3) 4 lbs. of expanded pumice (i.e. Corcel #46), (4) 22 liters of water, (5) 420 grams CMC and (6) 340 grams of mixed ⅛" and ¼" Dynel fibers. This paste is particularly useful with non-antimonial wound-wire grids such as disclosed in U.S. patent application Ser. No. 70,008, now Pat. No. 3,652,336, filed Sept. 8, 1970 and assigned to the assignee of this invention.

EXAMPLE III

A positive plate paste particularly useful with a non-antimonial grid of the Ser. No. 70,008 type is one containing (1) 300 lbs. of oxides, as above, (2) 4 lbs. of expanded pumice (i.e. Corcel #46), (3) 21 liters of water, (4) 420 grams of CMC, (5) 340 grams of sodium perborate and (6) 340 grams of mixed ⅛" and ¼" Dynel fibers. For antimonial grids the Dynel and perborate may be deleted.

Numerous modifications within the spirit and scope of this invention are possible, and though several specific examples are given, the invention is to be limited only to the extent defined hereafter in the appended claims.

We claim:

1. A lead oxide mixture adapted to form a cohesive paste for use in the preparation of lead-acid storage battery plates comprising lead oxides, at least one bulking agent selected from the group consisting of sulfates and carboxymethylcellulose, and about 0.3% to about 4% by weight of another bulking agent consisting essentially of hollow, multicellular, siliceous, amorphous globules having friable walls and intercell membranes.

2. A lead oxide mixture adapted to form a cohesive paste with water for use in the preparation of lead-acid storage battery plates comprising lead oxides, less than about 0.2% by weight carboxymethylcellulose and about 0.6% to about 4% by weight hollow, multicellular, siliceous, amorphous globules having friable walls and selected from the group consisting of expanded perlite and expanded pumice.

3. A lead oxide mixture adapted to form a cohesive paste with water for use in the preparation of negative, lead-acid, SLI-type storage battery plates comprising lead oxides, at least one expander, less than about 0.2% by weight carboxymethylcellulose and about 1% to about 2% by weight hollow, multicellular, siliceous, amorphous globules having friable walls and selected from the group consisting of expanded perlite and expanded pumice.

4. A lead oxide mixture adapted to form a cohesive paste for use in the preparation of lead-acid storage battery plates comprising lead oxides, a paste-bulking metal sulfate and about 0.3% to about 4% by weight hollow, multicellular, siliceous, amorphous globules having friable walls and intercell membranes.

5. A lead oxide mixture adapted to form a cohesive paste for use in the preparation of lead-acid storage battery plates comprising lead oxides, at least one battery paste bulking agent and about 0.3% to about 4% by weight, hollow multicellular, siliceous, amorphous globules having friable walls and selected from the group consisting of expanded perlite and expanded pumice.

References Cited

UNITED STATES PATENTS

| | | | |
|---|---|---|---|
| 1,788,571 | 1/1931 | Gardiner et al. | 136—26 |
| 2,674,642 | 4/1954 | Agruss et al. | 136—26 |
| 2,866,840 | 12/1958 | Dittmann et al. | 136—26 |
| 3,100,162 | 8/1963 | Sabatino et al. | 136—26 |
| 3,523,041 | 8/1970 | Limbert et al. | 136—26 |

ANTHONY SKAPARS, Primary Examiner